(12) United States Patent
Allen

(10) Patent No.: US 6,467,354 B1
(45) Date of Patent: Oct. 22, 2002

(54) ANODICALLY BONDED, GAS IMPERVIOUS CAVITY STRUCTURES FABRICATED IN SILICON

(75) Inventor: Henry V. Allen, Fremont, CA (US)

(73) Assignee: Silicon Microstructures, Inc., Milpitas, CA (US)

( * ) Notice: Subject to any disclaimer, the term of this patent is extended or adjusted under 35 U.S.C. 154(b) by 0 days.

(21) Appl. No.: 09/695,533

(22) Filed: Oct. 23, 2000

Related U.S. Application Data

(63) Continuation of application No. 09/150,199, filed on Sep. 8, 1998, now abandoned.

(51) Int. Cl.[7] .................................................. G01L 7/00
(52) U.S. Cl. ........................................................ 73/715
(58) Field of Search ..................... 338/4, 2, 42; 73/715, 73/720, 721–727, 706, 754, 777

(56) References Cited

U.S. PATENT DOCUMENTS 4,314,225 A * 2/1982 Tominaga et al. ............. 338/4
4,821,997 A * 4/1989 Zdeblick ...................... 251/11

* cited by examiner

*Primary Examiner*—William Oen
(74) *Attorney, Agent, or Firm*—Townsend and Townsend and Crew LLP

(57) ABSTRACT

Glass with metal deposited on it in a pattern which is slightly larger than the cavity area of the corresponding silicon wafer. The metal layer has a thickness such that the glass can deform sufficiently to allow bonding of the glass to the silicon. The metal is then compressively bonded to the silicon in a rim area around the edge of the cavity. The metal provides a barrier to helium which can leak through the glass, but is stopped by the metal barrier.

20 Claims, 1 Drawing Sheet

ANODICALLY BONDED, GAS IMPERVIOUS CAVITY STRUCTURES FABRICATED IN SILICON

This is a continuation of U.S. patent application Ser. No. 09/150,199 filed Sep. 8, 1998.

BACKGROUND OF THE INVENTION

Currently, pressure sensors are used in a number of applications where helium is used. Helium is sufficiently small a molecule that it is routinely used to detect leaks in systems, including slow leaks through glass to metal seals. This represents a problem for the standard pressure sensor built with a silicon micro-machined transducer when the die is bonded to glass for absolute pressure measurements. Helium diffuses through the glass and fills the reference chamber, thereby giving the impression of a zero shift in the output as a function of exposure to helium. Ultimately, the cavity will become filled with helium at a pressure equal to the helium pressure outside the sensor. The diffusion rates appear to be somewhat exponential. Typically, the time constant associated with this filling process is in the range of 50 to 100 hours. Thus in that time period, the vacuum reference chamber will fill with 63% of the outside helium pressure.

To overcome this, people have used fusion bonding of two silicon wafers together. The diffusivity of helium through silicon is such that the leakage rates are not measurable.

The disadvantage of the fusion bonding process is that it is not as often used as the anodic bond process for pressure sensors and the metal has to be put down after the fusion bond, meaning special processing. Moreover, while glass can be easily visualized for defects in the bond region, the fusion bond does not allow this. A further disadvantage is that the fusion bonded wafer approach cannot be purchased from a foundry service ready for micro-machining. Instead, the wafers have to be inventoried without metalization awaiting both fusion bonding and electrical testing.

All of the fusion bonding advantages could be overcome with a viable solution to helium leak in the conventional anodically bonded glass-silicon pressure sensors.

SUMMARY OF THE INVENTION

The present invention provides glass with metal deposited on it in a pattern which is slightly larger than the cavity area of the corresponding silicon wafer. The metal layer has a thickness such that the glass can deform sufficiently to allow bonding of the glass to the silicon. The metal is then compressively bonded to the silicon in a rim area around the edge of the cavity. The metal provides a barrier to helium, which can leak through the glass, but is stopped by the metal barrier.

In a preferred embodiment, a metal layer of between 600 and 1200 Angstroms is used, with either aluminum or titanium being the metal. An overlap beyond the cavity between 25 and 50 microns is preferred.

For further understanding of the nature and advantages of the invention, reference should be made to the following description taken in conjunction with the accompanying drawings.

DESCRIPTION OF THE PREFERRED EMBODIMENT

Figure 1:
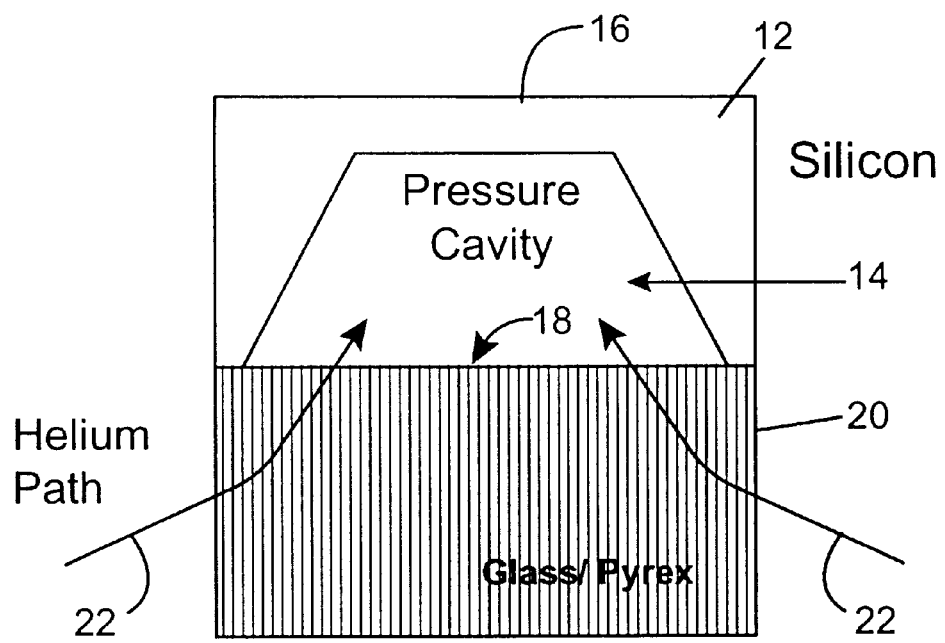
FIG. 1 is a cross-sectional view of a prior art pressure sensor.

FIG. 1 shows a prior art pressure sensor having a silicon block 12 defining a pressure cavity 14. A thin part of block 12 is a diaphragm 16, and the backside of the pressure cavity 14 is a backside opening 18. A glass block 20 is bonded to silicon block 12. When exposed to a gas or liquid to be measured diaphragm 16 will deflect, with the amount of deflection typically being detected by piezo resistors on the diaphragm which are connected to a monitoring circuit. Alternately, transduction approaches such as capacitive or resonant beam can be used.

As can be seen by arrows 22, helium has a migration path through the glass block 20 into the interior of pressure cavity 14.

Figure 2:
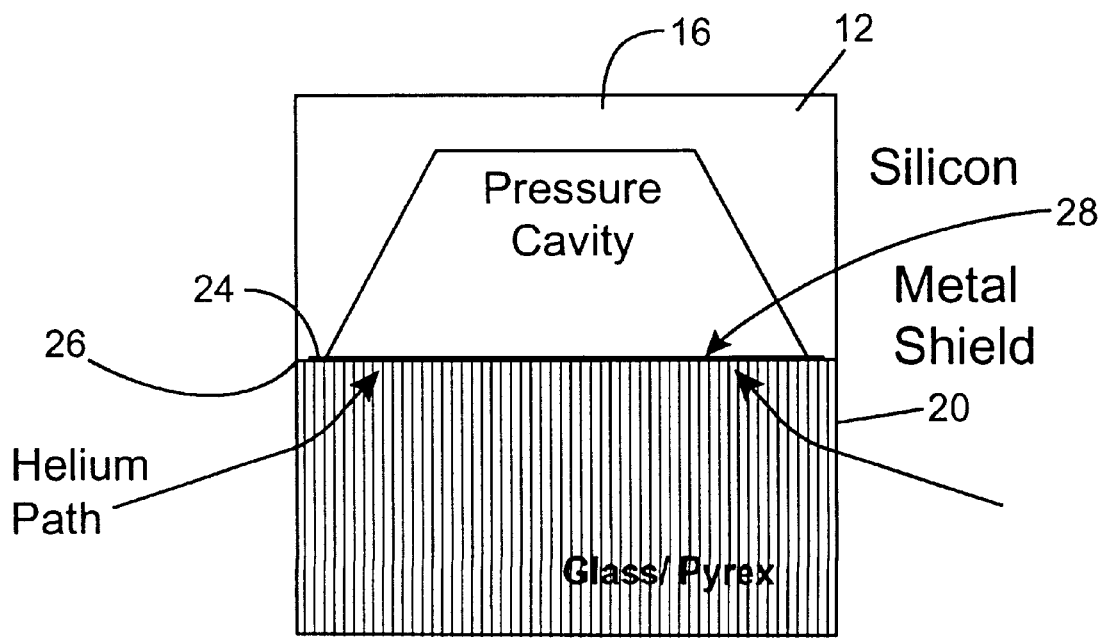
FIG. 2 is a cross-sectional view of pressure sensor according to one embodiment of the invention.

FIG. 2 illustrates a sensor according to the present invention including a metal layer 28 between the pressure cavity and the glass block 20. Layer 28 preferably extends a small amount 24 beyond the opening to the pressure cavity to provide some overlap. The glass can then bond to the silicon block 12 at a portion 26, where it deforms around the metal layer portion 24 to make contact. The metal is then compressively bound to the silicon block at this point.

The key source of the helium leak is through the glass. From the standpoint of cross-sectional area, the main leak area is in the interface between etched silicon cavity and the glass (the area not physically bonded during the anodic bonding process). By depositing a metal onto the glass with a pattern which is slightly larger than the actual cavity area and by aligning this pattern to the silicon, then when the glass and silicon are bonded together, the metal will form a metal barrier to the helium and prevent helium leakage.

In one embodiment, 600 to 1200 Angstroms of Aluminum are deposited on the glass, more preferably between 700 and 800 Angstroms, or approximately 750 Angstroms. This metal is easily patterned and is low cost. The metal is then selectively etched to leave only aluminum over the cavity and approximately 25 to 50, or up to 100, microns outside the cavity. The metal pattern may be just an oversided image of the cavity shape, or it may be a pattern of some sort that maximizes the total surface area at the bond edge, for example a serrated or scalloped pattern such as a series of half circles. During the anodic bond, the glass will deform in excess of 1200 Angstroms to allow bonding of the glass to the silicon. The aluminum will then be compressively bonded to the silicon in a rim of 25 to 50 microns around the edge of the cavity area. Alternate metals can be used including Titanium. Titanium has the advantage that it may help getter (absorb) residual oxygen molecules left in the cavity during the anodic bond. However, this is not usually a critical factor in choosing the metal.

The key factors in selecting the metal are its ease of handling and low cost in a semiconductor manufacturing environment and the ability to form a near defect-free layer in a 600 to 1200 Angstrom thickness.

The process details of one embodiment are set forth below:

1) Form the mask for the aluminum pattern.
2) Deposit 750 Angstroms Al on glass
3) Pattern the Al
4) Anodic bond the aluminum side of the glass to the silicon
5) Probe and Saw As will be understood by those skilled in the art, the present invention may be embodied in other specific forms without departing from the essential characteristics thereof. For example, while this invention has particular application to helium resistant pressure sensors, the approach is viable for other gases that can permeate glass and is also relevant to other structures, other than pressure sensors, where it is desirable to maintain a fixed pressure within a micromachined silicon cavity. These include, but are not limited to accelerometers where gas pressure needs to be maintained close to zero to minimize damping and thin heater elements where heat loss due to thermal conductivity of gases in the cavity are not desirable.

Accordingly, the foregoing description is intended to be illustrative, but not limiting, of the scope of the invention which is set forth in the following claims.

What is claimed is:

1. A pressure sensor comprising:

a silicon block having a diaphragm, a sidewall, and a backside opening the sidewall extending from the diaphram to the backside opening;

a substrate attached to the silicon block to cover the backside opening; and a metal layer on the substrate extending completely across and covering the backside opening, wherein at least a portion of the sidewall and the substrate are in direct contact.

2. The pressure sensor of claim 1 wherein the metal layer is aluminum.

3. The pressure sensor of claim 1 wherein the metal layer is titanium.

4. The pressure sensor of claim 1 wherein the metal layer has a thickness between 600 and 1200 Angstroms.

5. The pressure sensor of claim 1 wherein the metal layer has a thickness of between 700 and 800 Angstroms.

6. The pressure sensor of claim 1 wherein the metal layer extends between 25 and 100 microns beyond the backside opening.

7. The pressure sensor of claim 1 wherein the substrate is a glass block.

8. The pressure sensor of claim 7 wherein the glass block is anodically bonded to the silicon block.

9. The pressure sensor of claim 8 wherein the diaphragm comprises at least one piezo resistor.

10. An apparatus comprising:

a silicon block comprising:
      a diaphragm comprising at least one piezo resistor;
      a backside opening; and
      a sidewall extending from the diaphragm to the backside opening;

a substrate block attached to the silicon block, and extending across the backside opening; and a metal layer on the substrate block, completely covering the backside opening.

11. The apparatus of claim 10 wherein the metal layer extends under a first portion the sidewall, and the substrate block is in direct contact with at least a second portion of the sidewall.

12. The apparatus of claim 11 wherein the apparatus forms a pressure sensor.

13. The apparatus of claim 12 wherein the substrate block is a glass block.

14. The apparatus of claim 12 wherein the metal layer is aluminum.

15. The apparatus of claim 12 wherein the metal layer is titanium.

16. The apparatus of claim 12 wherein the metal layer has a thickness between 600 and 1200 Angstroms.

17. A pressure sensor comprising:

a silicon block comprising:
      a cavity having a backside opening;
      a diaphragm spaced from the backside opening by the cavity; and
      a sidewall extending from the diaphragm to the backside opening;

a metal layer completely covering the backside opening; and a substrate block attached to the silicon block and metal layer.

18. The pressure sensor of claim 17 wherein a portion of the substrate block is in direct contact with a portion of the silicon block.

19. The pressure sensor of claim 18 wherein the diaphragm comprises at least one piezo resistor.

20. The pressure sensor of claim 19 wherein the substrate block is a glass block.

* * * * *

UNITED STATES PATENT AND TRADEMARK OFFICE
CERTIFICATE OF CORRECTION

PATENT NO. : 6,467,354 B1
DATED : October 22, 2002
INVENTOR(S) : Henry V. Allen

It is certified that error appears in the above-identified patent and that said Letters Patent is hereby corrected as shown below:

<u>Title page,</u>
Item [54], now reading "ANODICALLY BONDED, GAS IMPERVIOUS CAVITY STRUCTURES FABRICATED IN SILICON"
should appear as follows:
-- PRESSURE SENSOR HAVING A SILICON AND METAL DEFINED REFERENCE CHAMBER FOR REDUCED LEAKAGE --

Signed and Sealed this

Twenty-fifth Day of November, 2003

JAMES E. ROGAN
*Director of the United States Patent and Trademark Office*